United States Patent
Poirier et al.

(10) Patent No.: US 9,512,267 B2
(45) Date of Patent: Dec. 6, 2016

(54) CATALYST SYSTEMS BASED ON PHENOLATE COMPLEXES FOR IMMORTAL RING-OPENING POLYMERIZATION OF CYCLIC ESTERS AND CARBOHYDRATES

(75) Inventors: Valentin Poirier, Rennes (FR); Jean-François Carpentier, Acigné (FR); Martine Slawinski, Nivelles (BE); Yann Sarazin, Rennes (FR); Marion Helou, Brussels (BE)

(73) Assignee: TOTAL RESEARCH & TECHNOLOGY FELUY, Seneffe (Feluy) (BE)

( * ) Notice: Subject to any disclaimer, the term of this patent is extended or adjusted under 35 U.S.C. 154(b) by 176 days.

(21) Appl. No.: 14/342,281

(22) PCT Filed: Aug. 31, 2012

(86) PCT No.: PCT/EP2012/066939
§ 371 (c)(1),
(2), (4) Date: Apr. 29, 2014

(87) PCT Pub. No.: WO2013/030324
PCT Pub. Date: Mar. 7, 2013

(65) Prior Publication Data
US 2014/0228535 A1  Aug. 14, 2014

(30) Foreign Application Priority Data
Sep. 2, 2011 (EP) ..................................... 11290394

(51) Int. Cl.
C08G 63/08 (2006.01)
C08G 63/82 (2006.01)
C08G 63/83 (2006.01)
C08G 63/85 (2006.01)
C08G 64/02 (2006.01)
C08G 63/64 (2006.01)
C08G 64/18 (2006.01)
C08G 64/38 (2006.01)

(52) U.S. Cl.
CPC ............. *C08G 63/823* (2013.01); *C08G 63/08* (2013.01); *C08G 63/64* (2013.01); *C08G 63/83* (2013.01); *C08G 63/85* (2013.01); *C08G 64/02* (2013.01); *C08G 64/18* (2013.01); *C08G 64/38* (2013.01)

(58) Field of Classification Search
CPC ......... C08G 63/08; C08G 63/83; C08G 64/02; C08G 63/85; C08G 64/38
See application file for complete search history.

(56) References Cited

U.S. PATENT DOCUMENTS

| 5,550,209 | A | 8/1996 | Inoue et al. | |
|---|---|---|---|---|
| 8,415,448 | B2 * | 4/2013 | Helou | C08G 64/30 528/128 |
| 2011/0224373 | A1 * | 9/2011 | Carpentier | C08F 293/00 525/90 |
| 2012/0136124 | A1 * | 5/2012 | Carpentier | C08G 64/18 525/439 |

FOREIGN PATENT DOCUMENTS

| EP | 2096132 A1 | 9/2009 |
|---|---|---|
| EP | 2253637 A1 | 11/2010 |
| WO | 2011/067385 A1 | 6/2011 |

OTHER PUBLICATIONS

International Search Report issued in PCT/EP2012/066939 mailed on Oct. 4, 2012, 3 pages.
Jincai Wu, et al., "Recent developments in main group metal complexes catalyzed/initiated polymerization of lactides and related cyclic esters", Coordination Chemistry Reviews, vol. 250, 2006, pp. 602-626, XP002667744.
K. E. Uhrich, et al.,"Polymeric Systems for Controlled Drug Release", Chemical Reviews, 1999, vol. 99, No. 11, pp. 3181-3198.
Y. Ikada, et al., "Biodegradable polyesters for medical and ecological applications", Macromolecular Rapid Communications, 2000, vol. 21, No. 3, pp. 117-132.
R. Langer, "Biomaterials in Drug Delivery and Tissue Engineering: One Laboratory's Experience", Accounts of Chemical Research, 2000, vol. 33, No. 2, pp. 94-101.
M. Okada, "Chemical syntheses of biodegradable polymers", Progress in Polymer Science, 2002, vol. 27, pp. 87-133.
M. Vert, "Aliphatic Polyesters: Great Degradable Polymers That Cannot Do Everything", Biomacromolecules, 2005, vol. 6, No. 2, pp. 538-546.
A.-C. Albertsson, et al., "Recent Developments in Ring Opening Polymerization of Lactones for Biomedical Applications", Biomacromolecules, 2003, vol. 4, No. 6, pp. 1466-1486.
K. Sudesh, et al., "Synthesis, structure and properties of polyhydroxyalkanoates: biological polyesters", Progress in Polymer Science, 2000, vol. 25, pp. 1503-1555.
L. S. Nair, et al., "Biodegradable polymers as biomaterials", Progress in Polymer Science, 2007, vol. 32, pp. 762-779.
S. Mecking, "Nature or Petrochemistry?—Biologically Degradable Materials", Angew. Chem. Int. Ed., 2004, vol. 43, pp. 1078-1085.
O. Dechy-Cabaret, et al., "Controlled Ring-Opening Polymerization of Lactide and Glycolide", Chemical Review, 2004, vol. 104, No. 12, pp. 6147-6176.

(Continued)

*Primary Examiner* — Gregory Listvoyb
(74) *Attorney, Agent, or Firm* — Albert Shung

(57) ABSTRACT

A method can include immortal ring-opening homopolymerisation of cyclic carbonates or cyclic esters in the presence of a catalytic system, or sequential two-step ring-opening block copolymerisation of one or more cyclic monomers selected from cyclic carbonates or cyclic esters in the presence of the catalytic system. The catalytic system can include a phenolate supported metallic complex. The catalytic system can also include an alcohol or a primary amine containing aliphatic and/or aromatic moieties. The alcohol or primary amine can be present in a molar ratio with respect to the metallic complex that is larger than 1.

20 Claims, 8 Drawing Sheets

(56) References Cited

OTHER PUBLICATIONS

R. E. Drumright, et al., "Polylactic Acid Technology", Advanced Materials, 2000, vol. 12, No. 23, pp. 1841-1846.

B. J. O'Keefe, et al., "Polymerization of lactide and related cyclic esters by discrete metal complexes", J. Chem. Soc., Dalton Trans., 2001, pp. 2215-2224.

X. Lou, et al., "Novel Aliphatic Polyesters Based on Functional Cyclic (Di)Esters", Macromolecular Rapid Communications, 2003, vol. 24, No. 2, pp. 161-172.

K. Nakano, et al., "Metal-catalyzed synthesis of stereoregular polyketones, polyesters, and polycarbonates", J. Chem. Soc., Dalton Trans., 2003, pp. 4039-4050.

A. Amgoune, et al., "Controlled ring-opening polymerization of lactide by group 3 metal complexes", Pure and Applied Chemistry, 2007, vol. 79, No. 11, pp. 2013-2030.

M. Cheng, et al., "Single-Site Catalysts for Ring-Opening Polymerization: Synthesis of Heterotactic Poly(lactic acid) from rac-Lactide", J. Am. Chem. Soc., 1999, vol. 121, No. 49, pp. 11583-11584.

B. M. Chamberlain, et al., "Polymerization of Lactide with Zinc and Magnesium beta-Diiminate Complexes: Stereocontrol and Mechanism", J. Am. Chem. Soc., 2001, vol. 123, No. 14, pp. 3229-3238.

C. K. Williams, et al., "A Highly Active Zinc Catalyst for the Controlled Polymerization of Lactide", J. Am. Chem. Soc., 2003, vol. 125, No. 37, pp. 11350-11359.

G. Labourdette, et al., "Unusually Stable Chiral Ethyl Zinc Complexes: Reactivity and Polymerization of Lactide", Organometallics, 2009, vol. 28, No. 5, pp. 1309-1319.

Z. Zheng, et al., "Zinc and enolato-magnesium complexes based on bi-, tri- and tetradentate aminophenolate ligands", New Journal of Chemistry, 2008, vol. 32, pp. 2279-2291.

N. Spassky, et al., "Highly stereoelective polymerization of rac-(D,L)-lactide with a chiral Schiff's base/aluminium alkoxide tiator", Macromol. Chem. Phys., 1996, vol. 197, pp. 2627-2637.

T. M. Ovitt, et al., "Stereoselective Ring-Opening Polymerization of meso-Lactide: Synthesis of Syndiotactic Poly(lactic acid)", J. Am. Chem. Soc., 1999, vol. 121, No. 16, pp. 4072-4073.

T. M. Ovitt, et al., "Stereochemistry of Lactide Polymerization with Chiral Catalysts: New Opportunities for Stereocontrol Using Polymer Exchange Mechanisms", J. Am. Chem. Soc., 2002, vol. 124, No. 7, pp. 1316-1326.

N. Nomura, et al., "Stereoselective Ring-Opening Polymerization of a Racemic Lactide by Using Achiral Salen- and Homosalen-Aluminum Complexes", Chemistry A European Journal, 2007, vol. 13, pp. 4433-4451.

H. Zhu, et al., "Group 13 and Lanthanide Complexes Supported by Tridentate Tripodal Triamine Ligands: Structural Diversity and Polymerization Catalysis", Organometallics, 2007, vol. 26, No. 22, pp. 5395-5405.

C.-X. Cai, et al. "Stereoselective ring-opening polymerization of racemic lactide using alkoxy-amino-bis(phenolate) group 3 metal complexes", Chem. Commun., 2004, pp. 330-331.

A. Amgoune, et al., "Ring-Opening Polymerization of Lactide with Group 3 Metal Complexes Supported by Dianionic Alkoxy-Amino-Bisphenolate Ligands: Combining High Activity, Productivity, and Selectivity", Chemistry A European Journal, 2006, vol. 12, pp. 169-179.

A. Amgoune, et al., "Highly Active, Productive, and Syndiospecific Yttrium Initiators for the Polymerization of Raceme beta-Butyrolactone", Angew. Chemi. Int. Ed., 2006, vol. 45, pp. 2782-2784.

L. R. Rieth, et al., "Single-Site beta-Diiminate Zinc Catalysts for the Ring-Opening Polymerization of beta-Butyrolactone and beta-Valerolactone to Poly(3-hydroxyalkanoates)", J. Am. Chem. Soc., 2002, vol. 124, No. 51, pp. 15239-15248.

N. Ajellal, et al., "Bis(guanidinate) Alkoxide Complexes of Lanthanides: Synthesis, Structures and Use in Immortal and Stereoselective Ring-Opening Polymerization of Cyclic Esters", Chemistry A European Journal, 2008, vol. 14, pp. 5440-5448.

N. Ajellal, et al., "Syndiotactic-Enriched Poly(3-hydroxybutyrate)s via Stereoselective Ring-Opening Polymerization of Raceme beta-Butyrolactone with Discrete Yttrium Catalysts", Macromolecules, 2009, vol. 42, No. 4, pp. 987-993.

S. Matsumura, "Enzymatic Synthesis of Polyesters via Ring-Opening Polymerization", Adv. Polym. Sci., 2005, vol. 194, pp. 95-132.

M. Le Hellaye, et al., "Biodegradable Polycarbonate-b-polypeptide and Polyester-b-polypeptide Block Copolymers: Synthesis and Nanoparticle Formation Towards Biomaterials", Biomacromolecules, 2008, vol. 9, No. 7, pp. 1924-1933.

D. J. Darensbourg, et al., "Biometal Derivatives as Catalysts for the Ring-Opening Polymerization of Trimethylene Carbonate. Optimization of the Ca(II) Salen Catalyst System", Macromolecules, 2006, vol. 39, No. 13, pp. 4374-4379.

M. Helou, et al., "Ultraproductive, Zinc-Mediated, Immortal Ring-Opening Polymerization of Trimethylene Carbonate", Chemistry A European Journal, 2008, vol. 14, pp. 8772-8775.

C.H. Zhou, et al., "Chemoselective catalytic conversion of glycerol as a biorenewable source to valuable commodity chemicals", Chemical Society Reviews, 2008, vol. 37, pp. 527-549.

A. Behr, et al., "Improved utilisation of renewable resources: New important derivatives of glycerol", Green Chemistry, 2008, vol. 10, pp. 13-30.

N.E. Kamber, et al., "Organocatalytic Ring-Opening Polymerization", Chemical Reviews, 2007, vol. 107, No. 12, pp. 5813-5840.

D. Bourissou, et al., "Recent advances in the controlled preparation of poly(alpha-hydroxy acids): Metal-free catalysts and new monomers", Chimie, 2007, vol. 10, pp. 775-794.

S. Asano, et al., "'Immortal' Polymerization. Polymerization of Epoxide catalyzed by an Aluminium Porphyrin-Alcohol System", Journal of the Chemical Society, Chemical Communications, 1985, pp. 1148-1149.

T. Aida, et al., "'Immortal' Polymerization. Polymerization of Epoxide and beta-Lactone with Aluminum Porphyrin in the Presence of Probe Compound", Macromolecules, 1988, vol. 21, No. 5, pp. 1195-1202.

T. Aida, et al., "Metalloporphyrins as Initiators for Living and Immortal Polymerizations", Acc. Chem. Res., 1996, vol. 29, No. 1, pp. 39-48.

E. Martin, et al., "Controlled Ring-Opening Polymerization of epsilon-Caprolactone Promoted by 'in Situ' Formed Yttrium Alkoxides", Macromolecules, 2000, vol. 33, No. 5, pp. 1530-1535.

A. Amgoune, et al., "Yttrium Complexes as Catalysts for Living and Immortal Polymerization of Lactide to Highly Heterotactic PLA", Macromolecular Rapid Communications, 2007, vol. 28, pp. 693-697.

S. Shanmuga Sundara Raj, et al., "Synthesis and structural characterization of 2,6-bis-(N-methylenemorpholino)-4-ter-butylphenol", Journal of Crystallographic and Spectroscopic Research, 1993, vol. 23, No. 7, pp. 607-610.

S. Teipel, et al., "A New Type of mu4-Oxo-Bridged Copper Tetramer: Synthesis, X-ray Molecular Structure, Magnetism and Spectral Properties of (mu4-Oxo)tetrakis(mu-bromo)bis(mu-2,6-bis(morpholinomethyl)-4-methylphenolato) tetracopper(II) and (mu4-Oxo)tetrakis(mu-benzoato)bis(mu-2,6-bis(morpholinomethyl)-4-methylphenolato)tetracopper (II)", Inorganic Chemistry, 1994, vol. 33, No. 3, pp. 456-464.

C. D. Schaeffer, et al., Journal of the American Chemical Society, 1974, vol. 96, pp. 7160-7162.

P. Foley, et al., "Bis(dimethylamido)tin(II). Synthesis and Characterization", Inorganic Chemistry, vol. 14, No. 9, pp. 2264-2267.

W.-B. Wang, et al., "Conversion of beta-Amino Esters to beta-Lactams via Tin(II) Amides", Journal of American Chemical Society, 1993, vol. 115, No. 21, pp. 9417-9420.

Willem M. Stevels, et al., A Versatile and Highly Efficient Catalyst System for the Preparation of Polyesters Based on Lanthanide Tris(2,6-di-tert-butylphenolate)s and Various Alcohols; Macromolecules 1996, 29, pp. 3332-3333.

Office Action issued in European Application No. 12751538.5, dated Aug. 11, 2015, 5 pages.

* cited by examiner

CATALYST SYSTEMS BASED ON PHENOLATE COMPLEXES FOR IMMORTAL RING-OPENING POLYMERIZATION OF CYCLIC ESTERS AND CARBOHYDRATES

CROSS REFERENCE TO RELATED APPLICATIONS

This application claims the benefit of PCT/EP2012/066939, filed on Aug. 31, 2012, which claims priority from European Application No. 11290394.3, filed on Sep. 2, 2011.

FIELD OF THE INVENTION

The present invention discloses new catalytic systems based on phenolate-supported metallic complexes for the immortal ring-opening polymerisation of cyclic esters and cyclic carbonates.

BRIEF DESCRIPTION OF THE PRIOR ART

Ring-opening polymerisation (ROP) of cyclic esters is the most convenient way to generate bio-degradable aliphatic polyesters as described in thorough details for example in review articles by Uhrich et al. (K. E. Uhrich, S. M. Cannizzaro, R. S. Langer, K. M. Shakesheff, Chem. Rev., 1999, 99, 3181-3198), or in Ikada and Tsuji (Y. Ikada, H. Tsuji, Macromol. Rapid. Commun., 2000, 21, 117-132) or in Langer (R. Langer, Acc. Chem. Res., 2000, 33, 94-101) or in Okada (M. Okada, Prog. Polym. Sci., 2002, 27, 87-133).

The emphasis was initially placed on the (co)polymerisation of ε-caprolactone (CL) and glycolide (GL) to generate polymers suitable for applications in the biomedical field as disclosed for example in Vert (M. Vert, Biomacromolecules 2005, 6, 538-546) or in Albertsson and Varma (A.-C. Albertsson, I. K. Varma, Biomacromolecules 2003, 4, 1466-1486) or in Sudesh et al. (K. Sudesh, H. Abe, Y. Doi Prog. Polym. Sci. 2000, 25, 1503-1555) or in Nair and Laurence (L. S. Nair, C. T. Laurence, Prog. Polym. Sci. 2007, 32, 762-798).

Many research groups have however recently shifted their attention towards the polymerisation of cyclic di-esters derived from lactic acid and more particularly to the polymerisation of L-lactide (L-LA=S,S-lactide) as described for example in Mecking (S. Mecking, Angew. Chem. Int. Ed., 2004, 43, 1078-1085) or in Dechy-Cabaret et al. (O. Dechy-Cabaret, B. Martin-Vaca, D. Bourissou, Chem. Rev., 2004, 104, 6147-6176). L-LA is a bio-renewable resource, which can be derived from the fermentation of sugar-containing plants, e.g., sugar-roots, potatoes and corn. Tin-based catalyst systems, based typically on tin(II) 2-ethylhexanoate (often referred to as "tin octanoate", hereafter abbreviated Sn(oct)$_2$), are commonly used in industry for the ROP of L-LA, other stereoisomers of lactide (e.g., meso-LA and rac-LA, a 50:50 mixture of L- and D-LA) and other cyclic monomers. The popularity of Sn(oct)2 as catalyst for the ROP of lactides owes very much to its low cost, its robustness (being both little sensitive to impurities and capable of polymerizing molten lactide to high molecular weight materials at temperatures as high as 180° C.) and its versatility. On the other hand, these catalytic systems are overall slow, rather poorly controlled and may present issues revolving around the heavy tin element, as discussed for example in Drumright et al. (R. E. Drumright, P. R. Gruber, D. E. Henton, Adv. Mater., 2000, 12, 1841-1846) or in Okada (M. Okada, Prog. Polym. Sci., 2002, 27, 87-133).

Recently, several well-defined metallic initiators have been developed for the controlled, living ROP of the various isomers of LA, namely rac-, L-, D- and meso-LA, as disclosed for example in O'Keefe et al. (B. J. O'Keefe, M. A. Hillmyer, W. B. Tolman, J. Chem. Soc., Dalton Trans., 2001, 2215-2224), or in Lou et al. (Lou, C. Detrembleur, R. Jérôme, Macromol. Rapid. Commun., 2003, 24, 161-172), or in Nakano et al. (K. Nakano, N. Kosaka, T. Hiyama, K. Nozaki, J. Chem. Soc., Dalton Trans., 2003, 4039-4050), or in Dechy-Cabaret et al. (O. Dechy-Cabaret, B. Martin-Vaca, D. Bourissou, Chem. Rev., 2004, 104, 6147-6176) or in Wu et al. (Wu, T.-L Yu, C.-T. Chen, C.-C. Lin, Coord. Chem. Rev., 2006, 250, 602-626), or in Amgoune et al. (Amgoune, C. M. Thomas, J.-F. Carpentier, Pure Appl. Chem. 2007, 79, 2013-2030).

They are based mostly on:
non-toxic zinc (M. Cheng, A. B. Attygalle, E. B. Lobkovsky, G. W. Coates, J. Am. Chem. Soc., 1999, 121, 11583-11584; B. M. Chamberlain, M. Cheng, D. R. Moore, T. M. Ovitt, E. B. Lobkovsky, G. W. Coates, J. Am. Chem. Soc., 2001, 123, 3229-3238; C. K. Williams, L. E. Breyfogle, S. K. Choi, W. Nam, V. G. Young Jr., M. A. Hillmyer, W. B. Tolman, J. Am. Chem. Soc., 2003, 125, 11350-11359; G. Labourdette, D. J. Lee, B. O. Patrick, M. B. Ezhova, P. Mehrkhodavandi, Organometallics, 2009, 28, 1309-1319; Z. Zheng, G. Zhao, R. Fablet, M. Bouyahyi, C. M. Thomas, T. Roisnel, O. Casagrande Jr., J.-F. Carpentier, New J. Chem., 2008, 32, 2279-2291), aluminium (N. Spassky, M. Wisniewski, C. Pluta, A. LeBorgne, Macromol. Chem. Phys., 1996, 197, 2627-2637; T. M. Ovitt, G. W. Coates, J. Am. Chem. Soc., 1999, 121, 4072-4073; M. Ovitt, G. W. Coates, J. Am. Chem. Soc., 2002, 124, 1316-1326; N. Nomura, R. Ishii, Y. Yamamoto, T. Kondo, Chem. Eur. J., 2007, 13, 4433-4451; H. Zhu, E. Y.-X. Chen, Organometallics, 2007, 26, 5395-5405) or group 3 metals and lanthanides (C.-X. Cai, A. Amgoune, C. W. Lehmann, J.-F. Carpentier, Chem. Commun., 2004, 330-331; A. Amgoune, C. M. Thomas, T. Roisnel, J.-F. Carpentier, Chem. Eur. J., 2006, 12, 169-179; A. Amgoune, C. M. Thomas, S. Ilinca, T. Roisnel, J.-F. Carpentier, Angew. Chem. Int. Ed., 2006, 45, 2782-2784).

Some of these single-site complexes are also efficient for the ROP of β-butyrolactone (BBL), producing poly(3-hydroxybutyrate)s, a naturally-occurring highly crystalline thermoplastic resin produced by several algae and bacteria as their isotactic stereoisomer, some catalytic systems leading to syndiotactic polymers as discussed by Amgoume et al. A. (Amgoune, C. M. Thomas, S. Ilinca, T. Roisnel, J.-F. Carpentier, Angew. Chem. Int. Ed., 2006, 45, 2782-2784), or by Rieth et al. (L. R. Rieth, D. R. Moore, E. B. Lobkovsky, G. W. Coates, J. Am. Chem. Soc., 2002, 124, 15239-15248) or by Ajellal et al. (N. Ajellal, D. M. Lyubov, M. A. Sinenkov, G. K. Fukin, A. V. Cherkasov, C. M. Thomas, J.-F. Carpentier, A. A. Trifonov, Chem. Eur. J., 2008, 14, 5440-5448) or by Ajellal et al. (N. Ajellal, M. Bouyahyi, A. Amgoune, C. M. Thomas, A. Bondon, I. Pillin, Y. Grohens, J.-F. Carpentier, Macromolecules, 2009, 42, 987-993).

The ROP of trimethylene carbonate (TMC) has also started to attract considerable attention in the past years as disclosed in S. Matsumura Adv. Polym. Sci. 2005, 194, 95-132, or in Hellaye et al. (M. Le Hellaye, N. Fortin, J. Guilloteau, A. Soum, S. Lecommandoux, S. M. Guillaume Biomacromolecules, 2008, 9, 1924-1933) or in Darensbourg et al. (D. J. Darensbourg, W. Choi, P. Ganguly, C. P. Richers Macromolecules, 2006, 39, 4374-4379) or in Helou et al. (M. Helou, O. Miserque, J.-M. Brusson, J.-F. Carpentier, S. M. Guillaume, Chem. Eur. J., 2008, 14, 8772-8775) or in European patent application no 08290187.7. TMC can be a bio-resourced monomer derived from glycerol, itself a by-product of the degradation of triglycerides. Unlike LA, TMC is not issued from the exploitation of resources otherwise used in the food chain as discussed by Zhou et al. (C.-H. Zhou, J. N. Beltramini, Y.-X. Fan, G. Q. Lu Chem. Soc. Rev. 2008, 37, 527-549) or by Behr et al. (A. Behr, J. Eilting, K. Irawadi, J. Leschinski, F. Lindner Green Chem. 2008, 10, 13-30).

In addition to the metal-based catalytic systems, one must mention the reports of Kamber et al. (N. E. Kamber, W. Jeong, R. M. Waymouth, R. C. Pratt, B. G. G. Lohmeijer, J. L. Hedrick, Chem. Rev., 2007, 107, 5813-5840 and Bourissou et al. (D. Bourissou, S. Moebs-Sanchez, B. Martin-Vaca, C. R. Chimie, 2007, 10, 775-794) who have pioneered the development of organocatalysts for the controlled ROP of the abovementioned heterocyclic monomers.

Significant advances have been achieved in the ROP of these monomers, most notably with respect to the catalyst productivity. Industrially, these systems must be able to polymerise several thousands of equivalents of monomer to yield hundreds of polymer chains per active centre. One way to reliably achieve such goal in the field of ROP is to operate chain transfer during the course of a so-called "immortal" living polymerisation, thanks to the addition of a chain-transfer agent, as described for example in European patent application no 08290187.7 or in Asano et al. (S. Asano, T. Aida, S. Inoue, J. Chem. Soc., Chem. Commum., 1985, 1148-1149) or in Aida et al. (T. Aida, Y. Maekawa, S. Asano, S. Inoue, Macromolecules, 1988, 21, 1195-1202) or in Aida and Inoue (T. Aida, S. Inoue, Acc. Chem. Res., 1996, 29, 39-48) or in Martin et al. (E. Martin, P. Dubois, R. Jérôme, Macromolecules, 2000, 33, 1530-1535) or in Amgoune et al. (A. Amgoune, C. M. Thomas, J.-F. Carpentier, Macromol. Rapid. Commun., 2007, 28, 693-697). For instance, European patent application no 08290187.7 disclosed that the binary system (BDI)ZnN(SiMe$_3$)$_2$/Bn-OH wherein BDI=(2,6-$^i$Pr$_2$—C$_6$H$_3$)N=C(Me)-CH=C(Me)-N(2,6-$^i$Pr$_2$—C$_6$H$_3$) and Bn-=C$_6$H$_5$CH$_2$— could be employed with great efficiency for the ROP of TMC, allowing the controlled polymerisation of up to 50 000 equivalents of TMC in presence of 50 equivalents of benzyl alcohol. The method used from 20 to 100 ppm of metal catalyst, thus minimising metal residues in the final polymers. Yet, although this metal catalyst is based on zinc, a so-called "bio-metal", the BDI ligand that supports the active metal center contains aromatic amine moieties that may be associated to potential toxicity issues.

There is therefore still a need to develop more active and productive catalyst systems for the ROP of cyclic (di)esters, which are ideally based based on non-toxic metals and that do not release toxic compounds from the ancillary ligands associated to the metal in the catalyst.

There is however large space left for improvement of these catalytic systems.

LIST OF FIGURES

Figure 9:
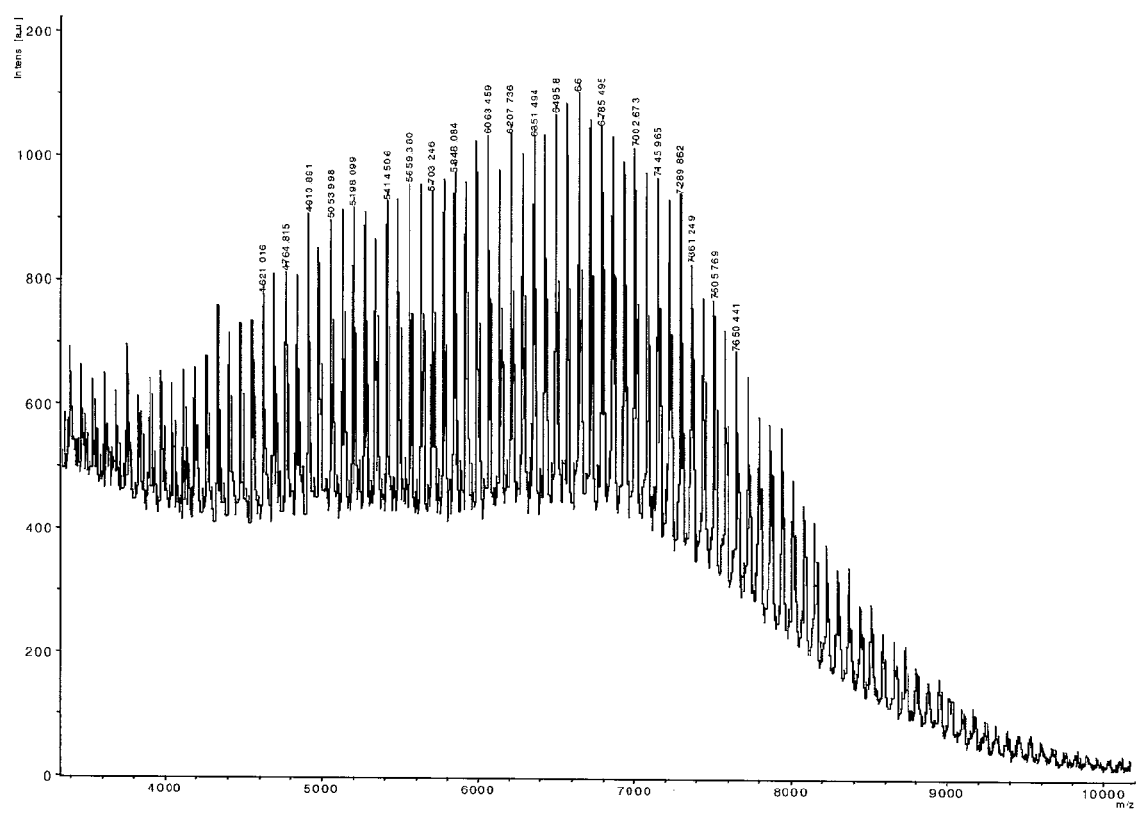

FIG. 9 represents the MALDI-TOF mass spectrum (main population: Na$^+$, minor population K$^+$) of a poly(L-lactide) sample (M$_{n,SEC}$=6 300 g·mol$^{-1}$) prepared with [L-lactide]/Sn(O-2,6-tBu-Ph)$_2$/[$^i$PrOH] ratio of 1 000:1:20 and 87% conversion. Observed molecular weights for the on-matrix compounds and those calculated using the (H)(C$_4$H$_8$O$_4$)$_n$(O-$^i$Pr).Na$^+$ formula, where n represents the degree of polymerisation differ by less than 1 Da.

SUMMARY OF THE INVENTION

It is an objective of the present invention to prepare new phenolate-based metallic complexes.

It is also an objective of the present invention to use the metallic complexes in catalytic systems for the controlled immortal ROP of cyclic (di)esters and cyclic carbonates.

It is a further objective of the present invention to prepare (multi)block copolymers of esters and carbonates.

The foregoing objectives have been carried out as described in the independent claims. Preferred embodiments are described in the dependent claims.

DETAILED DESCRIPTION OF THE INVENTION

Accordingly, the present invention discloses a catalytic system for the immortal ring-opening homopolymerisation, or the two-step, sequential ring-opening block copolymerisation of cyclic carbonates and cyclic esters, said catalytic system comprising:
  a) a metallic complex of formula M(OAr)$_n$X$_m$ wherein M is a metal selected from Sn, Zn, Al, OAr is a phenolate ligand, substituted or not, wherein X is alkyl having from 1 to 6 carbon atoms selected from methyl, ethyl, n-butyl, or phenyl, or an amido group selected from N(SiMe$_3$)$_2$, NMe$_2$, NEt$_2$, N$^i$Pr$_2$, or an alkoxide group selected from OEt, O$^i$Pr, O$^t$But, OCH$_2$Ph or OSiPh$_3$, and wherein n is at least 1 and n+m is the valence of metal M;
  b) an external nucleophile such as an alcohol ROH or a primary amine RNH$_2$ wherein R is an hydrocarbyl group, linear or branched, having from 1 to 20 carbon atoms, containing aliphatic and/or aromatic moieties, and used in excess with respect to the metallic complex.

Metal M is preferably selected from Sn or Zn, more preferably Sn. Preferably, m is equal to 0.

OAr is a phenolate-type ligand. The corresponding starting phenol pro-ligand has the formula:

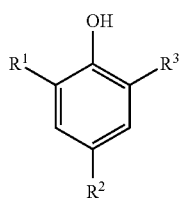

wherein
$R^1$, $R^2$ and $R^3$ are the same or are different and are hydrogen or are hydrocarbyl group having 1 to 20 carbon atoms, preferably selected from methyl, ethyl, iso-propyl, tert-butyl, neo-pentyl, cumyl, trityl or from phenyl, 2,4,6-trimethylphenyl, 2,6-diisopropylphenyl, or
wherein
$R^1$ and/or $R^3$ groups also contain functional coordinating moieties, including N, O, S, P elements. Notably, $R^1$ and/or $R^3$ are/is of the type

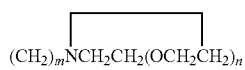

or $(CH_2)_mN(CH_2CH_2OCH_3)_2$ or $(CH_2)_mN$-morpholine, wherein m is 1, 2 or 3 and n≥1, and $R^2$ is hydrocarbyl having up to 10 carbon atoms.

These pro-ligands can be prepared following any method known in the art. The present method for preparing the pro-ligands and metal complexes is a modification of the method described in Schanmuga et al. (S. Shanmuga Sundara Raj, M. N. Ponnuswamy, G. Shanmugam, M. Kandaswamy, *J. Crystallogr. Spectrosc. Res.*, 1993, 23, 607-610) or in Teipel et al. (S. Teipel, K. Griesar, W. Haase, B. Krebs, *Inorg. Chem.*, 1994, 33, 456-464). The complete syntheses of ligands and the further syntheses of metal complexes can be achieved in at most 48 h to give analytically pure compounds on a multi-gram scale. For comparison, the synthesis of $(BDI)ZnN(SiMe_3)_2$, which is a very efficient zinc-based initiator for the ROP of LA, BBL or TMC, requires two full weeks and harsh conditions.

The pro-ligands are then used to prepare complexes of divalent metals of Groups 2 and 12 of the Periodic Table. The preferred metals Zn and Sn. The complexes are prepared by reacting the pro-ligand with a precursor $M(X)_2$ wherein X is either an alkyl having from 1 to 6 carbon atoms such as for example methyl, ethyl, n-butyl, phenyl, or an amido group such as for example $N(SiMe_3)_2$, $NMe_2$, $NEt_2$, $NiPr_2$, or an alkoxide group such as for example OEt, OiPr, OtBu, $OCH_2Ph$, $OSiPh_3$.

The present phenolate ligands are stabilising ligands, imactive by themselves, contrary to alkoxides ligands which act as initiators of the ring opening polymerisation of cyclic seters or carbonates.

In an embodiment according to the present invention $R^1$ is

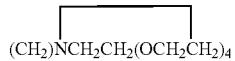

referred to as $[LO^3]$ or is $CH_2N$-morpholine) referred to as $[LO^2]$.

Preferably $R^2$ and $R^3$ are the same and are ter-butyl.

In another embodiment according to the present invention, $R^1$ and $R^3$ are the same and are tert-butyl, and $R^2$ is hydrogen or methyl, preferably hydrogen. It has surprisingly been observed that the metallic complex based on said ligand is very active in the homo- or co-ring opening polymerisation of cyclic esters or cyclic carbonates.

In the alcohol or the amine, preferably R is a primary or secondary alkyl residue or a benzylic group, more preferably it is iso-propyl ($^iPr$) or benzyl (Bn). It can also be a poly-ol such as a diol, triol or higher functionality polyhydridic alcohol, typically selected from 1,3-propanediol or trimethylolpropane, possibly derived from biomass such as glycerol or any other sugar-based alcohol such as for example erythritol or a cyclodextrine. All alcohols or amines can be used individually or in combination.

More preferably the alcohol is selected from iso-propanol, sec-butanol or benzyl alcohol.

In the presence of 1 to 1,000 equivalents, preferably of 5 to 200 equivalents of alcohol, amine or poly-ol with respect to metal, these metal complexes are very active and productive catalytic precursors for the controlled immortal ROP of lactides, cyclic esters and 5- to 7-membered cyclic carbonates. The polymerisation can be carried out in solution in an organic solvent or in melt, in the absence of solvent, at a temperature ranging from 20° C. to 250° C., preferably from 50° C. to 180° C. Typically, the conversion of at least 50 000 and up to 500 000 equivalents of monomer, preferably 50 000 to 100 000 equivalents, can be achieved in the presence of up to hundreds of equivalents of alcohol per metal centre.

Preferably, the cyclic esters are selected from L-lactide (L-LA), rac-lactide (rac-LA), ε-caprolactone or δ-valerolactone.

The preferred cyclic carbonates are selected from TMC and its substituted derivatives. Non-limitative examples are shown below:

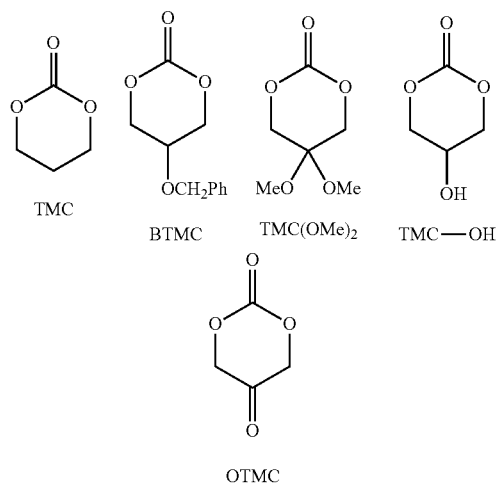

The polymers thus prepared show typically a unimodal molecular weight distribution that ranges from 1.1 to 5.0, more typically from 1.1 to 2.5.

The number average molecular weight $M_n$ can be tuned by the monomer-to-alcohol or monomer-to-amine ratio and ranges from 1 000 to 100 000 g/mol, more typically from 10

000 to 50 000 g/mol. In addition, the experimental molecular weights, as determined by size exclusion chromatoghraphy (SEC), are in good agreement with molecular weights calculated from the monomer-to-alcohol(amine) ratio and monomer conversion.

Another embodiment according to the present invention discloses a method for preparing a block copolymer comprising polyesterblocks and polycarbonate blocks in a sequential, two-step method comprising the steps of:
a) Injecting the metallic complex, alcohol in excess and a first cyclic monomer in the reactor;
b) Maintaining under first polymerisation conditions in order to form a first polymer block ending with a OH group;
c) Injecting a second cyclic monomer in the same reactor;
d) Maintaining under second polymerisation conditions in order to form a second polymer block attached to the first block.

EXAMPLES

Anhydrous $SnCl_2$ (Acros, 98%) and $LiNMe_2$ (Aldrich, 95%) were used as received. $Sn(NMe_2)_2$ was prepared as reported for example in Schaeffer and Zuckerman (Schaeffer, C. D. and Zuckerman, J. J., in J. Am. Chem. Soc., 96, 7160-7162, 1974), or in Foley and Zeldin (Foley, P. and Zeldin, M., in Inorg. Chem., 14, 2264-2267, 1975) or in Wang and Roskamp (Wang, W. B. and Roskamp E. J., in. J. Am. Chem. Soc., 115, 9417-9420, 1993).

$^{119}Sn$ NMR spectra were recorded on Bruker AC-300 and AM-400 spectrometers and were externally calibrated vs. $SnMe_4$ Synthesis of $Sn(O-2,6-^tBu-Ph)_2$.

Complex $Sn(O-2,6-^tBu-Ph)_2$ (1) was prepared by reacting two equivalents of $2,6-^tBu$-phenol with 1 equivalent of the amido precursor $Sn[N(SiMe_3)_2]_2$ in diethyl ether at room temperature. $Sn[N(SiMe_3)_2]_2$ 0.88 g (2.0 mmol) of $Sn[N(SiMe_3)_2]_2$ were added with a bent finger to a solution of 0.82 g of $2,6-^tBu$-phenol (4.0 mmol) in 30 mL of diethyl ether at room temperature. The resulting mixture was stirred for 16 h at room temperature; fast formation of a yellow precipitate was observed. The solvent was then removed by filtration and the resulting powder was washed twice with 10 mL of pentane, yielding, after drying under vacuum, 0.86 g of the homoleptic complex $Sn(O-2,6-^tBu-Ph)$ with a yield of 87%.

NMR ($^1H$, $^{13}C$, $^{119}Sn$) spectroscopy of the resulting yellow powder, which is insoluble in aliphatic hydrocarbons and partly soluble in aromatic solvents, confirmed the expected nature of the product in solution. $^1H$ NMR ($C_6D_6$, 400.13 MHz, 25° C.): $\delta_H$ 7.37 (4 H, d, $^3J_{HH}$=7.8 Hz, arom-H), 6.90 (2 H, t, $^3J_{HH}$=7.8 Hz, arom-H), 1.58 (36 H, br s, $C(CH_3)_3$) ppm. $^{13}C\{^1H\}$ NMR ($C_6D_6$, 75.47 MHz, 25° C.): $\delta_C$ 157.9, 139.5, 125.2, 119.1 (aromatic), 34.9 ($C(CH_3)_3$), 30.0 ($C(CH_3)_3$) ppm. $^{119}Sn\{^1H\}$ NMR ($C_6D_6$, 149.20 MHz, 25° C.): $\delta_{Sn}$ −216 ppm.

Figure 1:
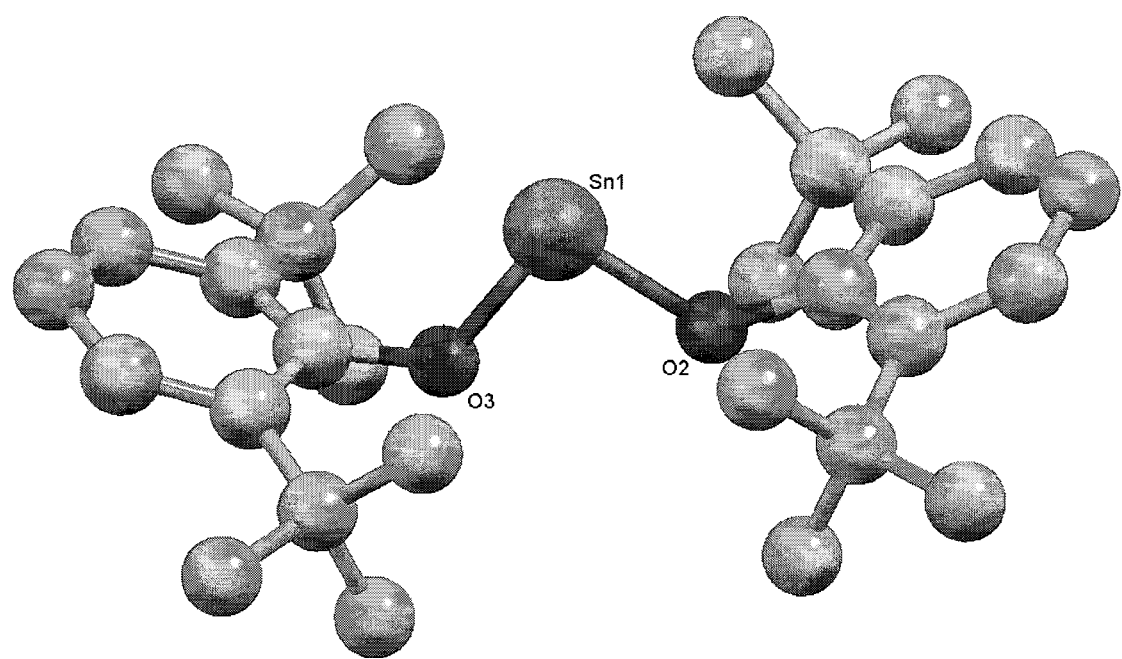
FIG. 1 represents the solid state structure of the metallic complex Sn(O-2,6-ditBuPh)$_2$.

Its solid-state structure was determined by X-ray diffraction crystallography and is represented in FIG. 1. It revealed a monomeric species with a tight O—Sn—O angle of 88.9°, evidencing the influence of the electrons' lone pair of the tin center. Despite the lack of chelation, the complex proved perfectly stable in solution ($C_6D_6$) with no decomposition observed over the course of several days.

Synthesis of $[LO^3]_2Sn$ (16)

A solution of 1.43 g of $[LO^3]H$ (3.28 mmol) in 30 mL of pentane was added at room temperature to a solution of 0.329 g of $Sn[NMe_2]_2$ (1.59 mmol) in 30 mL of pentane. The resulting mixture was stirred for 3 h at room temperature; fast formation of a white precipitate was observed. After concentration of the solution, the solvent was removed by filtration and the resulting solid was washed twice with 10 mL of pentane, yielding, after drying under vacuum, 1.40 g of homoleptic complex 16 with a yield of 89%. Elem. Anal. Found: C 60.6%, H 8.4%, N 2.7%. $C_{50}H_{84}N_2O_{10}Sn$ requires: C 60.5%, H 8.5%, N 2.8%. $^1H$ NMR ($C_6D_6$, 500.13 MHz, 25° C.): $\delta_H$=7.64 (2 H, d, $^4J_{HH}$=2.7 Hz, arom-H), 6.94 (2 H, d, $^4J_{HH}$=2.7 Hz, arom-H), 4.80 (2 H, br s, Ar—$CH_2$—N), 3.95-3.70 and 3.45-3.25 (38H, br m, O—$CH_2$, N—$CH_2$—$CH_2$, N—$CH_2$—Ar), 3.04 (4 H, br s, N—$CH_2$—$CH_2$), 1.75 (9 H, s, $C(CH_3)_3$), 1.46 (9 H, s, $C(CH_3)_3$) ppm. $^{13}C\{^1H\}$ NMR ($C_6D_6$, 125.76 MHz, 25° C.): $\delta_C$=159.2, 137.5, 137.2, 127.1, 123.7, 123.0 (aromatics), 71.0, 70.3, 70.2, 66.4 (O—$CH_2$), 56.0 (Ar—$CH_2$—N), 50.2 (N—$CH_2$—$CH_2$), 35.2 ($C(CH_3)_3$), 33.8 ($C(CH_3)_3$), 31.8 ($C(CH_3)_3$), 30.2 ($C(CH_3)_3$) ppm. $^{119}Sn\{^1H\}$ NMR ($C_6D_6$, 149.20 MHz, 25° C.): $\delta_{Sn}$=−566 ppm.

Synthesis of $[LO^3]SnNMe_2$ (17)

A solution of 0.43 g of $[LO^3]H$ (0.98 mmol) in 15 mL of pentane was added at a temperature of −80° C. over a period of 10 min to a solution of 0.21 g of $Sn[NMe_2]_2$ (1.01 mmol) in 30 mL of pentane. The resulting mixture was stirred for a period of time of 2 h and the temperature raised up to −30° C.; formation of a precipitate was observed. The volatiles were then removed under vacumm at room temperature and the resulting solid was washed three times with 3 mL of pentane, dried in vacuo to give complex 17 contaminated by less than 5% of homoleptic 16 (0.28 g, 48%). $^1H$ NMR ($C_6D_6$, 500.13 MHz, 25° C.): $\delta_H$=7.63 (1 H, d, $^4J_{HH}$=2.5 Hz, arom-H), 6.91 (1 H, d, $^4J_{HH}$=2.5 Hz, arom-H), 4.20-2.50 (22 H, br m, O—$CH_2$, N—$CH_2$—$CH_2$, N—$CH_2$—Ar), 3.26 (6 H, s, N—$CH_3$), 1.77 (9 H, s, $C(CH_3)_3$), 1.44 (9 H, s, $C(CH_3)_3$) ppm. $_{13}C\{^1H\}$ NMR ($C_6D_6$, 125.76 MHz, 25° C.): $\delta_C$=159.3, 139.1, 137.5, 125.9, 124.0, 122.6 (aromatics), 71.4, 69.9, 65.8 (O—$CH_2$, N—$CH_2$—$CH_2$), 57.3 (Ar—$CH_2$—N), 40.9 (N—$CH_3$), 35.2 ($C(CH_3)_3$), 33.9 ($C(CH_3)_3$), 31.9 ($C(CH_3)_3$), 30.2 ($C(CH_3)_3$) ppm. $^{119}Sn\{^1H\}$ NMR ($C_6D_6$, 149.20 MHz, 25° C.): $\delta_{Sn}$=−147 ppm.

Synthesis of $[LO^3]SnN(SiMe_3)_2$ (18)

Figure 2:
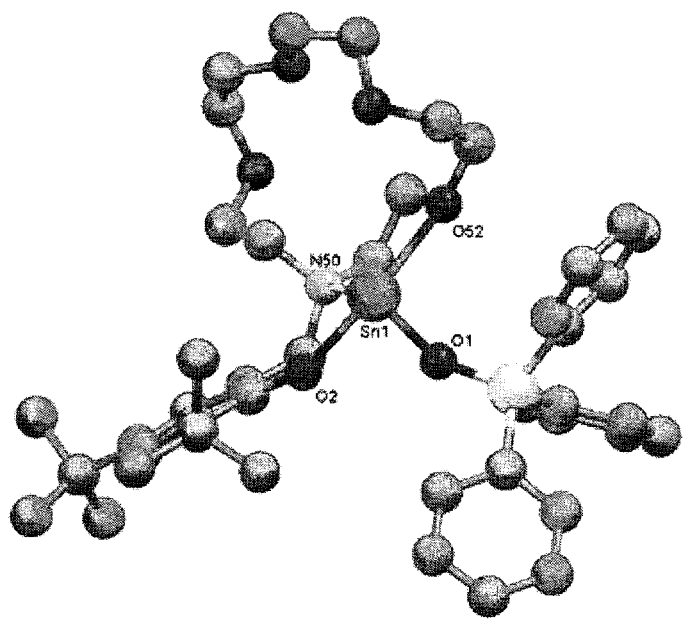
FIG. 2 represents the solid state structure of the metallic complex [LO$^3$]SnN(SiMe$_3$)$_2$.
Figure 3:
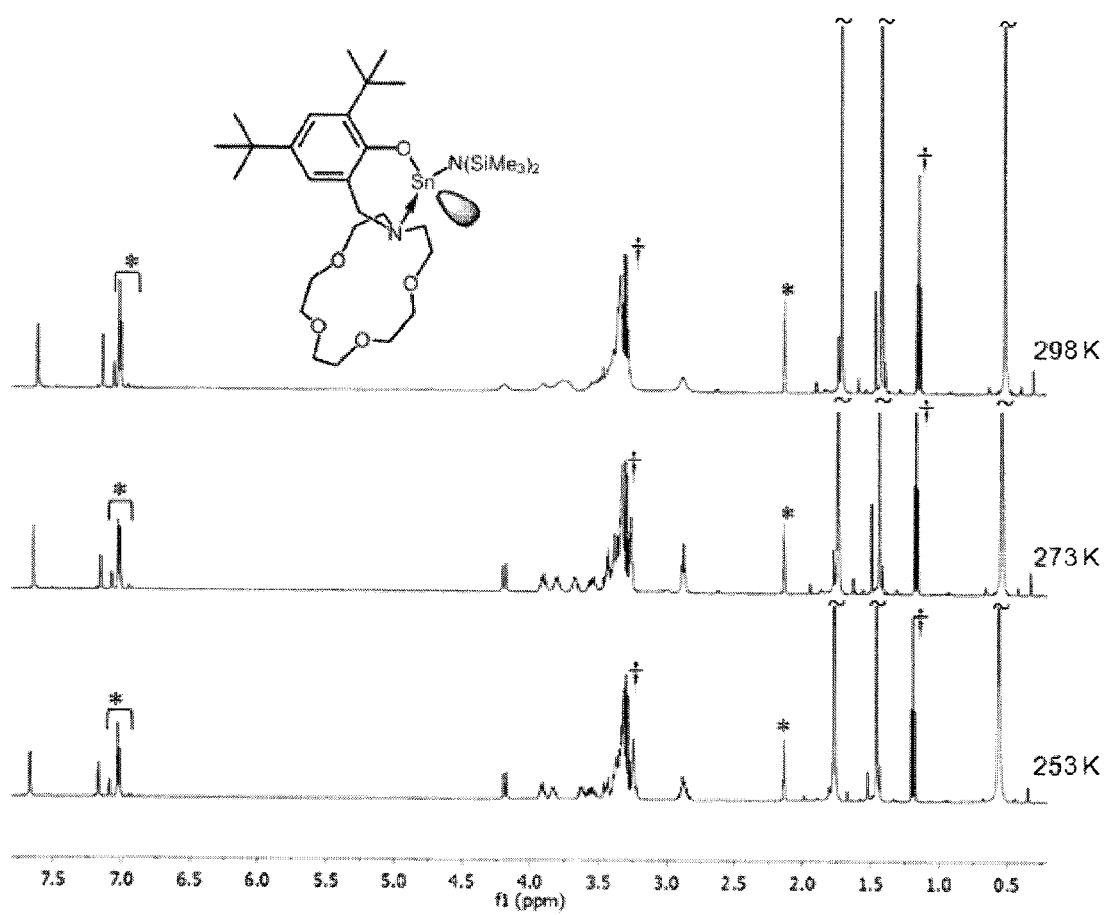
FIG. 3 represents the $^1$H NMR spectra (500 MHz, toluene-d$_8$) of the metallic complex [LO$^3$]SnN(SiMe$_3$)$_2$ at various temperatures.

A solution of 2.77 g of $[LO^3]H$ (6.32 mmol) in 30 mL of diethyl ether was added at a temperature of −80° C. over a period of time of 60 min to a solution of 2.92 g of $Sn[N(SiMe_3)_2]_2$ (6.64 mmol) in 50 mL of diethyl ether. It turned from a deep orange solution to a pale yellow solution. The resulting mixture was stirred for a period of time of 90 min, letting the temperature warm up to −40° C. and the volatiles were removed under vacuum. The resulting powder was washed three times with 10 mL of cold pentane at a temperature of −20° C. and dried in vacuo to give 4.1 g of 18 as a white powder with a yield of 91%. Single-crystals suitable for X-ray diffraction were obtained by re-crystallisation from a cold pentane solution. The solid state structure of complex 18 is represented in FIG. 2 and the $^1H$ NMR is represented in FIG. 3. $^1H$ NMR ($C_6D_6$, 500.13 MHz, 25° C.): $\delta_H$=7.63 (1 H, d, $^4J_{HH}$=2.6 Hz, arom-H), 7.00 (1 H, d, $^4J_{HH}$=2.6 Hz, arom-H), 4.18 (1 H, br s, Ar—$CH_2$—N), 3.88, 3.79, 3.64, 3.64 (4H, br s, N—$CH_2$—$CH_2$), 3.47-3.17 (15 H, br m, O—$CH_2$, N—$CH_2$—$CH_2$, Ar—$CH_2$—N), 2.88 (2H, br s, N—$CH_2$—$CH_2$), 1.70 (9 H, s, $C(CH_3)_3$), 1.39 (9 H, s, $C(CH_3)_3$), 0.50 (18 H, s, $N(Si(CH_3)_3)_2$) ppm. $^{13}C\{^1H\}$ NMR ($C_6D_6$, 125.76 MHz, 25° C.): $\delta_C$=158.4, 140.33, 139.13, 126.6, 124.5, 124.3 (aromatics), 71.0, 70.2 (O—$CH_2$), 65.5, 65.2 (N—$CH_2$—$CH_2$), 57.2 (Ar—$CH_2$—N), 53.1, 51.8 (N—$CH_2$—$CH_2$), 34.9 ($C(CH_3)_3$), 33.9 ($C(CH_3)_3$), 31.7 ($C(CH_3)_3$), 30.3 ($C(CH_3)_3$), 6.5

(N(Si(CH$_3$)$_3$)$_2$) ppm. $^{29}$Si{$^1$H} NMR (C$_7$D$_8$, 79.49 MHz, 25° C.): δ$_{Si}$=−0.49 ppm. $^{119}$Sn{$^1$H} NMR (C$_6$D$_6$, 149.20 MHz, 25° C.): δ$_{Sn}$=−55 ppm.

Synthesis of [LO$^3$]SnOSiPh$_3$ (21)

Figure 4:
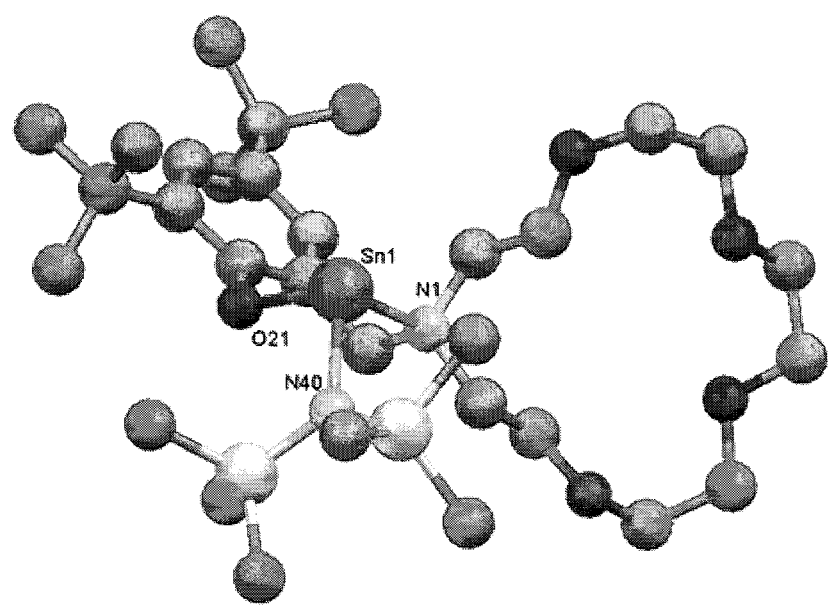
FIG. 4 represents the solid state structure of the metallic complex [Ln$^3$O]SnOSiPh$_3$.
Figure 5:
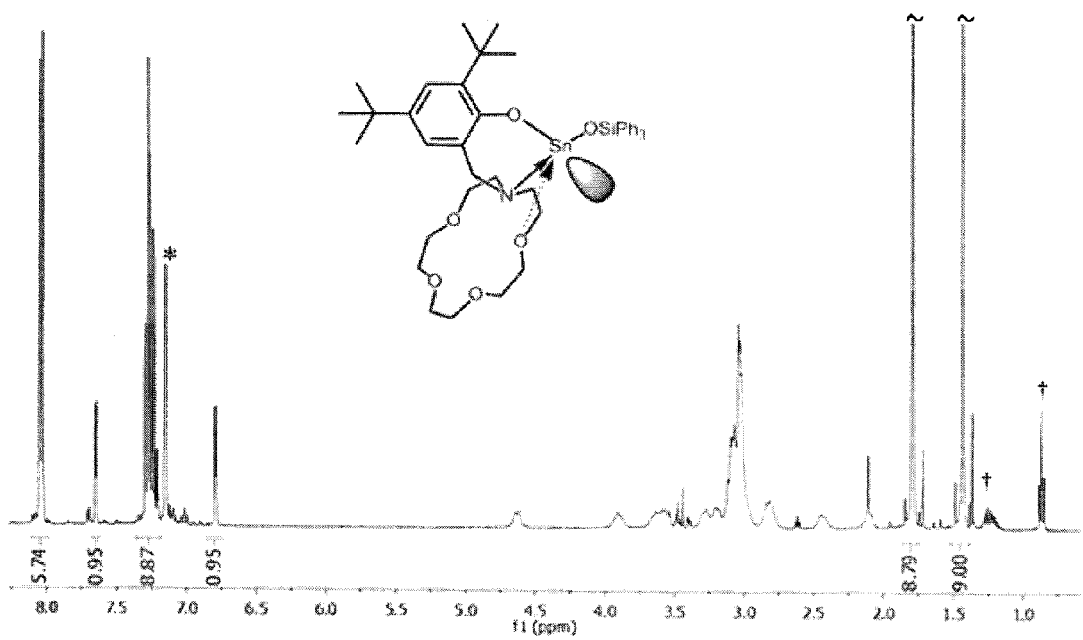
FIG. 5 represents the $^1$H NMR spectrum (500 MHz, toluene-d$_8$) of the metallic complex [LO$^3$]SnOSiPh$_3$.

A solution of 0.63 g of [LO$^3$]H (1.44 mmol) in 10 mL of diethyl ether was added at a temperature of −50° C. over a period of time of 20 min to a solution of 0.64 g of Sn[N(SiMe$_3$)$_2$]$_2$ (1.46 mmol) in diethyl ether (20 mL). The resulting mixture was stirred for further 20 min at a temperature of −50° C. before adding dropwise a solution of 0.41 g of HOSiPh$_3$ (1.39 mmol) in 10 mL of diethyl ether. The resulting solution was stirred for another 20 min at a temperature of −30° C. and the volatiles were then removed under vacuum. The resulting solid was washed three times with 10 mL of pentane and dried under vacuum, yielding 1.0 g of 21 as a white powder with a yield of 88%. Single-crystals suitable for X-ray diffraction were obtained by re-crystallization from a pentane solution. The solid state structure of complex 21 is represented in FIG. 4 and its $^1$H NMR is represented in FIG. 5. Elem. Anal. Found: C 62.3, H 6.8, N 1.6%. C$_{43}$H$_{57}$NO$_6$SiSn requires: C 62.2, H 6.9, N 1.7%. $^1$H NMR (C$_6$D$_6$, 500.13 MHz, 25° C.): δ$_H$=8.06 (6 H, m, arom-H), 7.66 (1 H, d, $^4$J$_{HH}$=2.6 Hz, arom-H), 7.24 (6 H, m, arom-H), 7.29 (3 H, m, arom-H), 6.80 (1 H, d, $^4$J$_{HH}$=2.6 Hz, arom-H), 4.63 (1 H, m, Ar—CH$_2$—N), 3.91 (1 H, br m, N—CH$_2$—CH$_2$), 3.64 (1 H, br m, N—CH$_2$—CH$_2$), 3.57 (1 H, br m, N—CH$_2$—CH$_2$), 3.27, 3.20, 3.14-2.92 (14 H, br m, O—CH$_2$, N—CH$_2$—CH$_2$), 2.82 (2 H, br m, Ar—CH$_2$—N, N—CH$_2$—CH$_2$), 2.43, 2.09 (2 H, br s, N—CH$_2$—CH$_2$), 1.81 (9 H, s, C(CH$_3$)$_3$), 1.44 (9 H, s, C(CH$_3$)$_3$) ppm. $^{13}$C{$^1$H} NMR (C$_6$D$_6$, 125.76 MHz, 25° C.): δ$_C$=158.9, 140.7, 138.5, 137.0, 135.6, 128.7, 128.0 (overlapped with C$_6$D$_6$), 128.5, 124.1, 122.0 (aromatics), 70.8, 70.6, 69.5, 69.0 (O—CH$_2$), 66.2, 64.5 (N—CH$_2$—CH$_2$), 58.9 (Ar—CH$_2$—N), 53.8, 48.6 (N—CH$_2$—CH$_2$), 35.2 (C(CH$_3$)$_3$), 33.9 (C(CH$_3$)$_3$), 31.9 (C(CH$_3$)$_3$), 30.1 (C(CH$_3$)$_3$) ppm. $^{29}$Si{$^1$H} NMR (C$_6$D$_6$, 79.49 MHz, 25° C.): δ$_{Si}$=−22.2 ppm. $^{119}$Sn{$^1$H} NMR (C$_6$D$_6$, 149.20 MHz, 25° C.): δ$_{Sn}$=−459 ppm.

Synthesis of [LO$^2$]SnN(SiMe$_3$)$_2$ (23)

A solution of 0.25 g of [LO$^2$]H (0.81 mmol) in 20 mL of diethyl ether was added at a temperature of −45° C. over a period of time of 15 min to a solution of 0.37 g of Sn[N(SiMe$_3$)$_2$]$_2$ (0.84 mmol) in 20 mL of diethylether. The resulting mixture was stirred for a period of time of 15 minutes at a temperature of −45° C. and the volatiles were then removed under vacuum. The sticky solid was stripped with six times 5 mL of pentane, but complete removal of the amine could not be achieved. A small quantity of avout 30 g of 23 could be obtained completely pure by precipitation over weeks of a concentrated solution in pentane at a temperature of −50° C. $^1$H NMR (C$_6$D$_6$, 400.13 MHz, 25° C.): 67 $_H$=7.68 (1 H, d, $^4$J$_{HH}$=2.6 Hz, arom-H), 6.80 (1H, d, $^4$J$_{HH}$=2.6 Hz, arom-H), 4.3-1.8 (10 H, br m, Ar—CH$_2$—N—CH$_2$—CH$_2$—O), 1.68 (9 H, s, C(CH$_3$)$_3$), 1.41 (9 H, s, C(CH$_3$)$_3$), 0.45 (18 H, s, N(Si(CH$_3$)$_3$)$_2$) ppm. $^{13}$C{$^1$H} NMR (C$_6$D$_6$, 100.62 MHz, 25° C.): δ$_C$ 157.8, 139.8, 138.8, 125.6, 124.1, 122.3 (aromatics), 64.0 (O—CH$_2$), 60.1 (Ar—CH$_2$—N), 52.4 (N—CH$_2$—CH$_2$), 34.3 (C(CH$_3$)$_3$), 33.4 (C(CH$_3$)$_3$), 31.1 (C(CH$_3$)$_3$), 29.7 (C(CH$_3$)$_3$), 5.8 (N(Si(CH$_3$)$_3$)$_2$) ppm. $^{29}$Si{$^1$H} NMR (C$_7$D$_8$, 79.49 MHz, 25° C.): δ$_{Si}$=0.14 ppm. $^{119}$Sn{$^1$H} NMR (C$_7$D$_8$, 149.20 MHz, 25° C.): δ$_{Sn}$=−42 ppm.

Polymerisation Results.

The ring opening polymerisation of L-lactide was carried out in toluene with [L-LA]$_0$ 2.0M or 4.0 M as indicated in Table 1.

Various metallic pre-catalysts were used with an excess of $^i$PrOH as indicated in Table 1. The amount of monomer, polymerisation temperature and time and polymerisation results are also indicated in Table 1.

TABLE 1

| Complex | La/Sn/alcohol | T °C. | [L-LA] mol/L | Time min | Yield % | Mn$_{calc}$ g/mol | Mn$_{SEC}$ g/mol | Mw/Mn |
|---|---|---|---|---|---|---|---|---|
| 17 | 1000/1/10 | 60 | 2 | 90 | 82 | 11800 | 10600 | 1.09 |
| 17 | 1000/1/10 | 60 | 2 | 180 | 89 | 12800 | 11400 | 1.11 |
| 18 | 500/1/10 | 60 | 2 | 150 | 91 | 6600 | 7700 | 1.17 |
| 18 | 1000/1/10 | 60 | 2 | 180 | 87 | 12500 | 11900 | 1.11 |
| 18 | 1000/1/5 | 60 | 2 | 180 | 87 | 25100 | 28800 | 1.29 |
| 18 | 1000/1/20 | 60 | 2 | 180 | 91 | 6600 | 7600 | 1.15 |
| 23 | 1000/1/10 | 60 | 2 | 180 | 83 | 11900 | 1300 | 1.11 |
| 16 | 1000/1/10 | 60 | 2 | 180 | 88 | 12700 | 14000 | 1.17 |
| 21 | 500/1/10 | 60 | 2 | 300 | 0 | — | — | — |
| Sn(O-2,6-$^t$Bu—Ph)$_2$ | 1000/1/10 | 60 | 2 | 180 | 90 | 13000 | 15000 | 1.14 |
| Sn(O-2,6-$^t$Bu—Ph)$_2$ | 1000/1/5 | 60 | 2 | 180 | 92 | 26500 | 28400 | 1.23 |
| Sn(O-2,6-$^t$Bu—Ph)$_2$ | 1000/1/20 | 60 | 2 | 180 | 87 | 6300 | 7700 | 1.11 |
| Sn(Oct)$_2$ | 1000/1/10 | 60 | 2 | 180 | 0 | — | — | — |
| Sn(Oct)$_2$ | 1000/1/10 | 60 | 2 | 1440 | 72 | 10300 | 11600 | 1.07 |
| Sn(O-2,6-$^t$Bu—Ph)$_2$ | 5000/1/25 | 110 | 4 | 120 | 95 | 27600 | 32900 | 1.85[a] |
| Sn(Oct)$_2$ | 5000/1/25 | 110 | 4 | 120 | 75 | 21500 | 23700 | 1.11[a] |
| Sn(O-2,6-$^t$Bu—Ph)$_2$ | 5000/1/25 | 110 | 4 | 120 | 56 | 16100 | 15700 | 1.12[b] |

[a]made with ultra pure monomer
[b]made with technical monomer (wet)

The polydispersity index is represented by the ratio Mw/Mn of the weight average molecular weight Mw over the number average molecular weight Mn.

The number average molecular weight is measured by size exclusion chromatography (SEC) vs. polystyrene standards and corrected by a factor of 0.58. It is calculated from formula Mn=[L-lactide]$_0$[$^i$PrOH]$_0$×monomer conversion×M$_{L\text{-}lactide}$+M$_{iPrOH}$, wherein M$_{L\text{-}lactide}$=144 g·mol$^{-1}$ and M$_{iPrOH}$=60 g·mol$^{-1}$ Additional examples were prepared with non purified and twice purified L-LA, using the catalyst systems Sn(Oct)$_2$/octanol or Sn(O-2,6-$^t$Bu-Ph)$_2$/octanol. The copolymerisation conditions and results for the non purified L-LA are summarised in Table 2. The copolymerisation conditions and results for the twice purified L-LA are summarised in Table 3.

TABLE 2

| Complex | La/Sn/octanol | T °C. | Time min | Yield % | Mn$_{calc}$ g/mol | Mn$_{SEC}$ g/mol | M$_w$/M$_n$ |
|---|---|---|---|---|---|---|---|
| Sn(Oct)$_2$ | 6 000/1/14.8 | 185 | 5 | 25 | — | — | — |
| Sn(Oct)$_2$ | 6 000/1/14.8 | 185 | 15 | 79 | — | — | — |
| Sn(Oct)$_2$ | 6 000/1/14.8 | 185 | 30 | 92 | 53 838 | 41 260 | 1.60 |
| Sn(O-2,6-$^t$Bu—Ph)$_2$ | 6 000/1/14.8 | 185 | 5 | 47.5 | — | — | — |
| Sn(O-2,6-$^t$Bu—Ph)$_2$ | 6 000/1/14.8 | 185 | 15 | 89.6 | — | — | — |
| Sn(O-2,6-$^t$Bu—Ph)$_2$ | 6 000/1/14.8 | 185 | 30 | 92.9 | 54 364 | 45 850 | 1.43 |
| Sn(Oct)$_2$ | 72 000/1/178 | 185 | 60 | 42.4 | — | — | — |
| Sn(Oct)$_2$ | 72 000/1/178 | 185 | 180 | 85.6 | — | — | — |
| Sn(Oct)$_2$ | 72 000/1/178 | 185 | 300 | 89.6 | 52 319 | 40 812 | 1.62 |
| Sn(O-2,6-$^t$Bu—Ph)$_2$ | 72 000/1/178 | 185 | 60 | 42.9 | — | — | — |
| Sn(O-2,6-$^t$Bu—Ph)$_2$ | 72 000/1/178 | 185 | 180 | 84.8 | — | — | — |
| Sn(O-2,6-$^t$Bu—Ph)$_2$ | 72 000/1/178 | 185 | 300 | 91 | 53 135 | 42 150 | 1.41 |

TABLE 3

| Complex | La/Sn/octanol | T °C. | Time min | Yield % | Mn$_{calc}$ g/mol | Mn$_{SEC}$ g/mol | M$_w$/M$_n$ |
|---|---|---|---|---|---|---|---|
| Sn(Oct)$_2$ | 6 000/1/14.8 | 185 | 1 | 0 | — | — | — |
| Sn(Oct)$_2$ | 6 000/1/14.8 | 185 | 5 | 79 | — | — | — |
| Sn(Oct)$_2$ | 6 000/1/14.8 | 185 | 15 | 91.4 | — | — | — |
| Sn(Oct)$_2$ | 6 000/1/14.8 | 185 | 30 | 92.1 | 53 896 | 49 321 | 1.65 |
| Sn(O-2,6-$^t$Bu—Ph)$_2$ | 6 000/1/14.8 | 185 | 1 | 84.7 | — | — | — |
| Sn(O-2,6-$^t$Bu—Ph)$_2$ | 6 000/1/14.8 | 185 | 5 | 88 | — | — | — |
| Sn(O-2,6-$^t$Bu—Ph)$_2$ | 6 000/1/14.8 | 185 | 15 | 91.9 | — | — | — |
| Sn(O-2,6-$^t$Bu—Ph)$_2$ | 6 000/1/14.8 | 185 | 30 | 93 | 54 421 | 56 326 | 1.46 |
| Sn(Oct)$_2$ | 72 000/1/178 | 185 | 5 | 0 | — | — | — |
| Sn(Oct)$_2$ | 72 000/1/178 | 185 | 10 | 62.2 | — | — | — |
| Sn(Oct)$_2$ | 72 000/1/178 | 185 | 20 | 88.2 | 51 504 | 44 231 | 1.61 |
| Sn(O-2,6-$^t$Bu—Ph)$_2$ | 72 000/1/178 | 185 | 5 | 51.7 | — | — | — |
| Sn(O-2,6-$^t$Bu—Ph)$_2$ | 72 000/1/178 | 185 | 10 | 66.9 | — | — | — |
| Sn(O-2,6-$^t$Bu—Ph)$_2$ | 72 000/1/178 | 185 | 20 | 92.3 | 53 892 | 49 985 | 1.43 |

Figure 6:
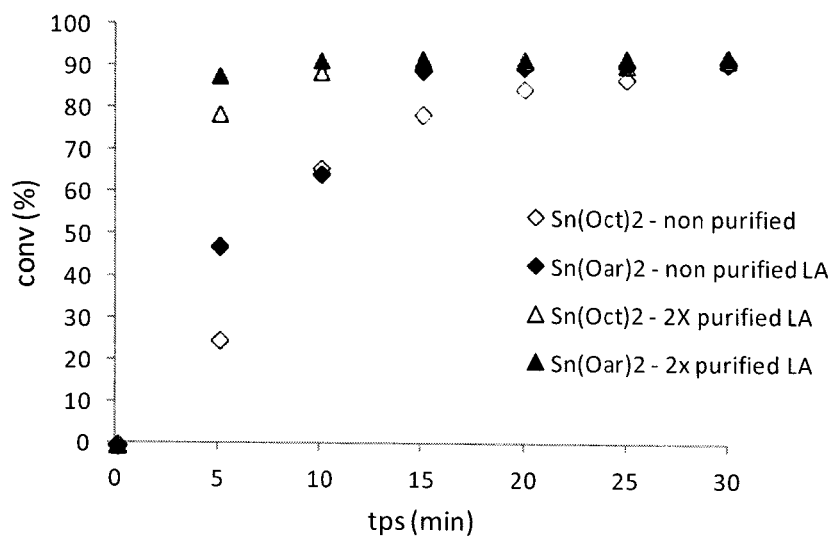
FIG. 6 represents the conversion rate, expressed in percent, as a function of time, expressed in minutes, for catalysts Sn(Oct)$_2$ and Sn(OAr)$_2$ and for a ratio ([LA]$_0$/[Sn]$_0$/[Octanol]$_0$ of 6 000/1/14.8.
Figure 7:
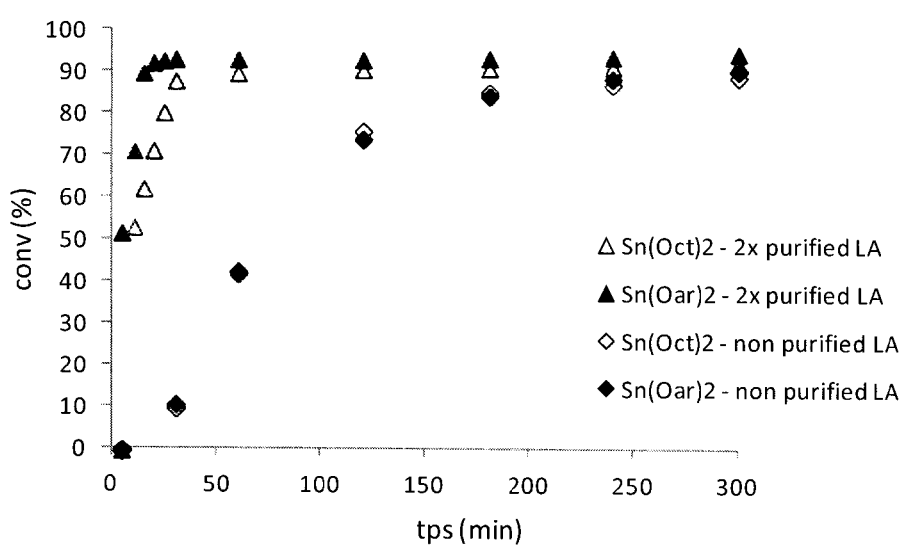
FIG. 7 represents the conversion rate, expressed in percent, as a function of time, expressed in minutes, for catalysts Sn(Oct)$_2$ and Sn(OAr)$_2$ and for a ratio ([LA]$_0$/[Sn]$_0$/[Octanol]$_0$ of 72 000/1/178.

The conversion rate, expressed in percent, as a function of time, expressed in minutes, is represented in FIG. 6 for the two catalysts Sn(Oct)$_2$ and Sn(OAr)$_2$ and for a ratio ([LA]$_0$/[Sn]$_0$/[Octanol]$_0$ of 6 000/1/14.8. It is represented in FIG. 7 for the same two catalysts and a ratio ([LA]$_0$/[Sn]$_0$/[Octanol]$_0$ of 72 000/1/178.

Ring opening polymerisation of twice purified L-LA has also been carried out with catalyst system Zn(LO$^3$)$_2$/octanol.

Synthesis of Zn(LO$^3$)$_2$

A solution of 2.20 g of [LO$^3$]H (5.02 mmol) in 50 mL of toluene was added at room temperature to a solution of 0.92 g of Zn[N(SiMe$_3$)$_2$]$_2$ (2.39 mmol) in 40 mL of toluene. The resulting mixture was stirred at a temperature of 40° C. for a period of time of 3 h and volatiles were removed under vacuum. Pentane was added to the resulting oil until a white solid precipitated. The solid was isolated by filtration and washed 3 times with 10 mL of pentane to afford 2.20 g of Zn(LO$^3$)$_2$ with a yield of 98%, as a colorless powder which was dried in vacuo.

Found: C 64.2, H 8.8, N 2.9%. C$_{50}$H$_{84}$N$_2$O$_{10}$Zn requires: C 64.0, H 9.0, N 3.0%.

$^1$H NMR (C$_6$D$_6$, 500.13 MHz, 25° C.): δ$_H$=7.57 (2 H, d, $^4$J$_{HH}$=2.6 Hz, arom-H), 6.94 (2 H, d, $^4$J$_{HH}$=2.6 Hz, arom-H), 4.3-3.0 (44 H, br m, macrocyclic-H), 1.69 (18 H, s, C(CH$_3$)$_3$), 1.45 (18 H, s, C(CH$_3$)$_3$) ppm.

$^{13}$C{$^1$H} NMR (C$_6$D$_6$, 100.03 MHz, 25° C.): δ$_C$=163.9, 137.9, 134.8, 125.9, 124.0, 119.8 (aromatics), 71.1, 70.8, 70.5 (br), 67.0, 65.4, 61.2, 54.3, 49.8, 35.3 (C(CH$_3$)$_3$), 33.8 (C(CH$_3$)$_3$), 31.9 (C(CH$_3$)$_3$), 30.0 (C(CH$_3$)$_3$) ppm.

The polymerisation conditions and results are displayed in table 4.

TABLE 4

| Complex | La/Sn/octanol | T °C. | Time min | Yield % | Mn$_{calc}$ g/mol | Mn$_{SEC}$ g/mol | M$_w$/M$_n$ |
|---|---|---|---|---|---|---|---|
| Zn(LO$^3$)$_2$ | 6 000/1/14.8 | 185 | 10 | 0 | — | — | — |
| Zn(LO$^3$)$_2$ | 6 000/1/14.8 | 185 | 20 | 9 | — | — | — |
| Zn(LO$^3$)$_2$ | 6 000/1/14.8 | 185 | 30 | 20 | — | — | — |
| Zn(LO$^3$)$_2$ | 6 000/1/14.8 | 150 | 10 | 0 | — | — | — |
| Zn(LO$^3$)$_2$ | 6 000/1/14.8 | 150 | 20 | 0 | — | — | — |
| Zn(LO$^3$)$_2$ | 6 000/1/14.8 | 150 | 30 | 0 | — | — | — |
| Zn(LO$^3$)$_2$ | 6 000/1/14.8 | 110 | 10 | 21.2 | — | — | — |
| Zn(LO$^3$)$_2$ | 6 000/1/14.8 | 110 | 20 | 46.4 | — | — | — |
| Zn(LO$^3$)$_2$ | 6 000/1/14.8 | 110 | 30 | 76.4 | 45 118 | 42 250 | 1.63 |

A yellow solution and very poor conversions were observed at temperatures of 150° C. and 185° C. It seems that a temperature of 110° C. is most appropriate to carry out the efficient and controlled ROP of L-La.

The controlled immortal ROP process was observed using the catalytic systems based on these Sn(OAr)$_2$/$^i$PrOH as it could be clearly seen that the molecular weights were determined by the monomer/alcohol ratio. The corresponding polydispersity indices were also very narrow.

Figure 8:
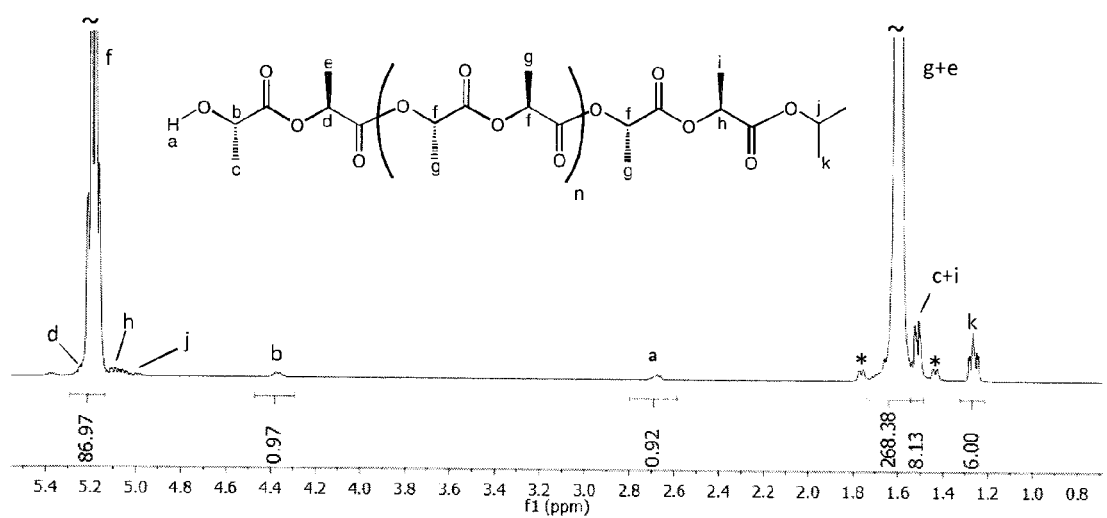
FIG. 8 represents the $^1$H NMR spectrum (400 MHz, CDCl$_3$, 298 K) of a poly(L-lactide) obtained with the catalytic system Sn(O-2,6-$^t$Bu-Ph)$_2$/$^i$PrOH binary systems using a [L-lactide]/[Sn]/[$^i$PrOH] in a 1 000:1:20 ratio with an 87% conversion (*$^{13}$C satellites).

NMR spectroscopy (FIG. 8), and MALDI-ToF-MS (FIG. 9) analysis of the resulting polymers confirmed their expected structure, especially the nature of their chain-ends, even if quantitative transesterification reactions appeared to occur as detected by the increment between two consecutive signals of the MALDI-ToF mass spectrum which was measured as 72 Da instead of 144 Da. These results obtained with complexes Sn(O-2,6-$^t$Bu-Ph)$_2$ of the type are particularly suitable for industrial applications as they are very robust, cheap and as efficient as more complex heteroleptic complexes such as [LO³]SnNMe₂ or [LO³]SnN(SiMe₃)₂. It has been surprisingly observed that they were more efficient than the currently used Sn(Oct)₂.

It must be added that the present catalyst precursors, Sn-bis(phenolates or [LO³]SnNMe₂ or [LO³]SnN(SiMe₃)₂, based on phenolate ligands, are better catalyst precursors than Sn(Oct)₂, meaning that for an equivalent amount of Sn precursor the polymerisation reaction is faster than with Sn(Oct)₂ precursor. As a result, less precursor is needed than with the prior art systems, thereby leaving less residual metal in the final polymer.

Large loadings of monomer of about 5 000 equivalents were fully converted, with a polymerisation temperature of 110° C. It must be noted that an overestimated reaction time generally results in a larger than usual distribution of molecular weights. A comparative study with the archetypal Sn(Oct)₂ confirmed the superiority of Sn(O-2,6-ᵗBu-Ph)₂ regarding catalytic activities at 60° C. at all monomer loadings and polymerisation temperatures.

Sequential Block Copolymerization of Trimethylene Carbonate and Lactide.

The ring opening polymerisation of trimethylene carbonate (1000 equiv vs Sn) was carried out with the Sn(O-2,6-ᵗBu-Ph)₂/BnOH system (1:10) in toluene solution with [TMC]₀=2.0M, at a temperature of 60° C. for 3 h. After this time period, an aliquot of the reaction mixture was sampled, and analysed by 1H NMR and SEC. This revealed 96% conv of TMC and the production of a BnO-PTMC-OH polymer with Mn=9,800 g/mol and Mw/Mn=1.25. Then, L-Lactide (1000 equiv. vs Sn) was introduced in the reaction vessel, under controlled atmosphere, and the reaction mixture was heated at 60° C. for an additional 3 h period. The mixture was analysed by 1H NMR and SEC. This revealed 90% conv of L-LA and the production of a BnO-PTMC-b-PLLA-OH block copolymer with Mn=22,800 g/mol and Mw/Mn=1.30. The block copolymer was isolated by precipitation after adding methanol to the reaction mixture.

The invention claimed is:

1. A method comprising:
    immortal ring-opening homopolymerisation of cyclic carbonates or cyclic esters in the presence of a catalytic system to form a homopolymer, or sequential two-step ring-opening block copolymerisation of cyclic monomers comprising cyclic carbonates and cyclic esters in the presence of the catalytic system to form a block copolymer comprising a polyester block and a polycarbonate block, wherein the catalytic system comprises:
    a metallic complex of formula M(OAr)nXm; wherein M is Sn; wherein OAr is a phenolate ligand; wherein X is an alkyl having from 1 to 6 carbon atoms, an amido group, or an alkoxide group; and wherein n is at least 1 and n+m is the valence of M; and
    an alcohol ROH or a primary amine RNH₂; wherein R is an hydrocarbyl group, linear or branched, having from 1 to 20 carbon atoms, containing aliphatic and/or aromatic moieties; and wherein the alcohol or the primary amine is present in a molar ratio with respect to the metallic complex that is larger than 1;
    wherein the phenolate ligand is prepared from a phenol-based pro-ligand of formula

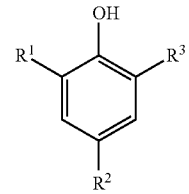

wherein R¹, R² and R³ are the same or are different and are each a hydrogen or are selected from methyl, ethyl, iso-propyl, tert-butyl, neo-pentyl, cumyl, trityl, phenyl, 2,4,6-trimethylphenyl, 2,6-diisopropylphenyl.

2. The method of claim 1, wherein the immortal ring-opening homopolymerisation of the cyclic carbonates or the cyclic esters in the presence of the catalytic system is performed to form the homopolymer.

3. The method of claim 1, wherein the sequential two-step ring-opening block copolymerisation of the cyclic monomers comprising the cyclic carbonates and the cyclic esters in the presence of the catalytic system is performed to form the block copolymer comprising the polyester block and the polycarbonate block.

4. The method of claim 3, wherein R¹ and/or R³ contain functional coordinating moieties.

5. The method of claim 4, wherein the functional coordinating moieties include N, O, S, or P.

6. The method of claim 3, wherein R¹ and/or R³ are $(CH_2)_mNCH_2CH_2(OCH_2CH_2)_n$ or $(CH2)_mN(CH_2CH_2OCH_3)_2$; wherein m is 1, 2 or 3 and n≥1.

7. The method of claim 6, wherein R¹ is $(CH_2)NCH_2CH_2(OCH_2CH_2)_4$ or CH₂N-morpholine, wherein R² and R³ are the same and are tert-butyl, and wherein M is tin(II).

8. The method of claim 1, X is selected from:
    methyl, ethyl, n-butyl, or phenyl;
    N(SiMe₃)₂, NMe₂, NEt₂, or NiPr₂; or
    OEt, OiPr, OtBu, OCH₂Ph, or OSiPh₃.

9. The method of claim 1, wherein R¹ and R³ are the same and are tert-butyl, wherein R² is hydrogen, wherein M is tin(II), wherein n=2, and wherein m=0.

10. The method of claim 1, wherein R, in the alcohol ROH or the primary amine RNH₂ is a primary or secondary alkyl residue, a benzylic group, a poly-ol, or a combination thereof.

11. The method of claim 10, wherein the poly-ol is a diol, a triol, or a higher functionality polyhydridic alcohol.

12. The method of claim 10, wherein R is iPr, a benzyl group, or (CH₂)₇CH₃.

13. The method of claim 1, wherein a molar ratio alcohol/metal ranges between 1 and 1000.

14. The method of claim 13, wherein the molar ratio alcohol/metal ranges between 5 and 200.

15. The method of claim 1, wherein a molar ratio monomer/metal ranges between 500 and 500,000.

16. The method of claim 15, wherein the molar ratio monomer/metal ranges between 1,000 and 100,000.

17. The method of claim 1, wherein the cyclic esters are selected from L-lactide (L-LA), rac-lactide (rac-LA), ε-caprolactone, or δ-valerolactone, and wherein the cyclic carbonates are selected from TMC and substituted derivatives of TMC.

18. The method of claim 17, wherein the cyclic carbonates are selected from:

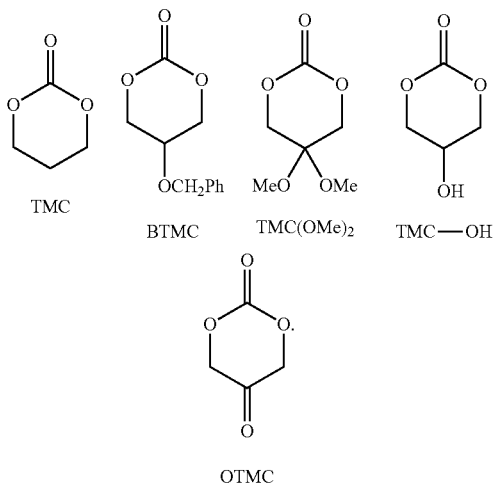

19. The method of claim 1, wherein the block copolymer comprising polyester blocks and polycarbonate blocks is prepared in the sequential, two-step method by:
injecting the metallic complex, more than one equivalent of the alcohol with respect to M, and first cyclic monomers selected from the cyclic carbonates and the cyclic esters in a reactor;
maintaining under first polymerisation conditions in order to form a first polymer block ending with an OH group;
injecting second cyclic monomers selected from the cyclic carbonates and the cyclic esters in the reactor; and
maintaining under second polymerisation conditions in order to form a second polymer block attached to the first block.

20. The method of claim 1, wherein the sequential two-step ring-opening block copolymerisation of the cyclic carbonates and the cyclic esters in the presence of the catalytic system is performed to form the block copolymer comprising the polyester block and the polycarbonate block, and wherein from 5 to 200 equivalents of the alcohol or the primary amine are present with respect to M of the metallic complex.

* * * * *